United States Patent

[11] 3,545,412

[72] Inventor Brice W. Kinyon
 Chattanooga, Tennessee
[21] Appl. No. 734,322
[22] Filed June 4, 1968
[45] Patented Dec. 8, 1970
[73] Assignee Combustion Engineering, Inc.
 Windsor, Connecticut
 a corporation of Delaware

[54] MOLTEN SALT OPERATED GENERATOR-SUPERHEATER USING FLOATING HEAD DESIGN
 8 Claims, 4 Drawing Figs.

[52] U.S. Cl.................................................. 122/34,
 122/483
[51] Int. Cl.................................................. F22b 1/02
[50] Field of Search........................................ 122/32, 34,
 483; 165/159, 160

[56] References Cited
 UNITED STATES PATENTS
 3,049,105 8/1962 Waldrun........................ 122/483
 3,097,630 7/1963 Kinyon et al.................. 122/34

3,141,445 7/1964 Bell............................... 122/34

Primary Examiner—Kenneth W. Sprague
Attorneys—Carlton F. Bryant, Eldon H. Luther, Robert L. Olson, John F. Carney, Richard H. Berneike, Edward L. Kochey, Jr. and Lawrence P. Kessler ABSTRACT: A vapor generator organization in the form of a shell and tube-type heat exchanger for producing superheated vapor and particularly adapted for use of molten metal or molten metal salts as a heating medium. The heating medium is circulated through the tubes of a tube bundle that is immersed in vaporizable liquid transforming some of it to vapor that flows to a vapor space in the unit. Each of the tubes is enclosed by sleeves forming annular passages about the tubes. These passages communicate with the vapor space and conduct vapor from that space along paths parallel with the tubes of the tube bundle such that the flowing vapor acts as an intermediate heat transfer agent between the high temperature heating medium flowing through the tubes and the vaporizable fluid that immerses the tube bundle. Additional means are provided such that the vapor, after passing through the section of the unit that contains vaporizable liquid, is permitted to extract additional heat from the heating medium in order to have its temperature raised to a predetermined superheat temperature.

PATENTED DEC 8 1970

INVENTOR.
BRICE W. KINYON

BY *John F. Carney*

ATTORNEY

MOLTEN SALT OPERATED GENERATOR-SUPERHEATER USING FLOATING HEAD DESIGN

BACKGROUND OF THE INVENTION

Nuclear-operated power plants consist essentially of a neutronic reactor that produces thermal energy and a vapor generator that utilizes the energy produced in the reactor to generate vapor for operating a turbogenerator set. Transfer of the thermal energy from the reactor to the vapor generator is normally accomplished by circulating a fluid heat transfer agent, referred to as the primary coolant, in heat exchange relation with the active portion of the reactor to extract heat therefrom. In the case of a boiling water reactor plant the primary coolant serves as the vaporizable liquid. In a pressurized water reactor plant heat from the primary coolant is passed directly in heat exchange relation with vaporizable fluid flowing through the vapor generator while in a liquid metal-cooled reactor plant it is passed to an intermediate heat transfer agent referred to as the secondary coolant which, in turn, transfers the heat to the vaporizable fluid flowing through the vapor generator.

While boiling water and pressurized water reactor plants make up the predominant portion of commercial nuclear-operated plants in the United States, they both suffer from the fact that they must operate at reduced efficiencies due to the relatively low temperature of the vapor produced in each. Since the efficiency of any power-generating system is directly related to the temperature at which energy is produced, there has been great effort expended in the art to operate reactors at temperatures as high as possible. As a result of this effort, it has been proposed, and reactor plants are under development, to employ high-melting molten metal or molten metal salts as the primary or secondary system coolants.

The effort to develop commercially feasible plants utilizing these coolants has met with considerable difficulty. First, due to the great temperature difference existing between the molten metal or metal salt reactor coolant and saturated water at reasonable operating pressures, e.g. for example 1200° F. in the coolant as against 500° F. in the water, a vapor generator designed to produce vapor directly from the reactor coolant would be subject to extremely high stresses due to thermal shocking. Secondly, since most coolants of this type have melting points above the saturation temperature of the vaporizable liquid, there would be a tendency for the coolant to freeze in the area of the feedwater inlet.

To avoid this latter problem, it is necessary to employ an intermediate heat transfer agent or secondary coolant having a lower melting point, such as sodium, to transfer heat from the primary coolant to a vaporizable liquid. This, of course, adds considerably to the fabrication and operating costs of the plant and at the same time fails to avoid the problem of thermal shocking. The present invention, therefore, is directed to the solution of both of these problems in commercially feasible nuclear-operated power plants.

SUMMARY OF THE INVENTION

According to the present invention a vapor generator apparatus is provided that is capable of employing molten metal or molten metal salts directly as its heating medium for producing superheated vapor and in a manner that eliminates the danger of thermal shocking of the generator and freezing of the heating medium. The apparatus embodies a shell and tube-type heat exchanger wherein the tubes that form a tube bundle occupying substantially the full transverse section of the shell are adapted to conduct high temperature fluid heated by the molten metal or metal salt heating medium that is circulated through the reactor. The interior of the shell contains means that define a vapor generation section in which a body of vaporizable liquid is disposed and a vapor space thereabove through both of which the tubes of the tube bundle extend. The tubes are each enclosed by concentrically spaced, elongated sleeves that define annular passages that extend along the tubes. These passages communicate with the vapor space of the vessel and are adapted to conduct flowing vapor from that space through the region of the vapor generation chamber, thus to provide an intermediate heat transfer agent between the high temperature heating medium flowing through the tubes and the lower temperature vaporizable liquid in the liquid body disposed in the chamber. A section of the shell beneath the vapor generation chamber is maintained devoid of liquid and the vapor, in flowing through this section, extracts and retains heat from the heating medium in the tubes to be heated to the desired superheat temperature.

PREFERRED EMBODIMENT

Figure 1:
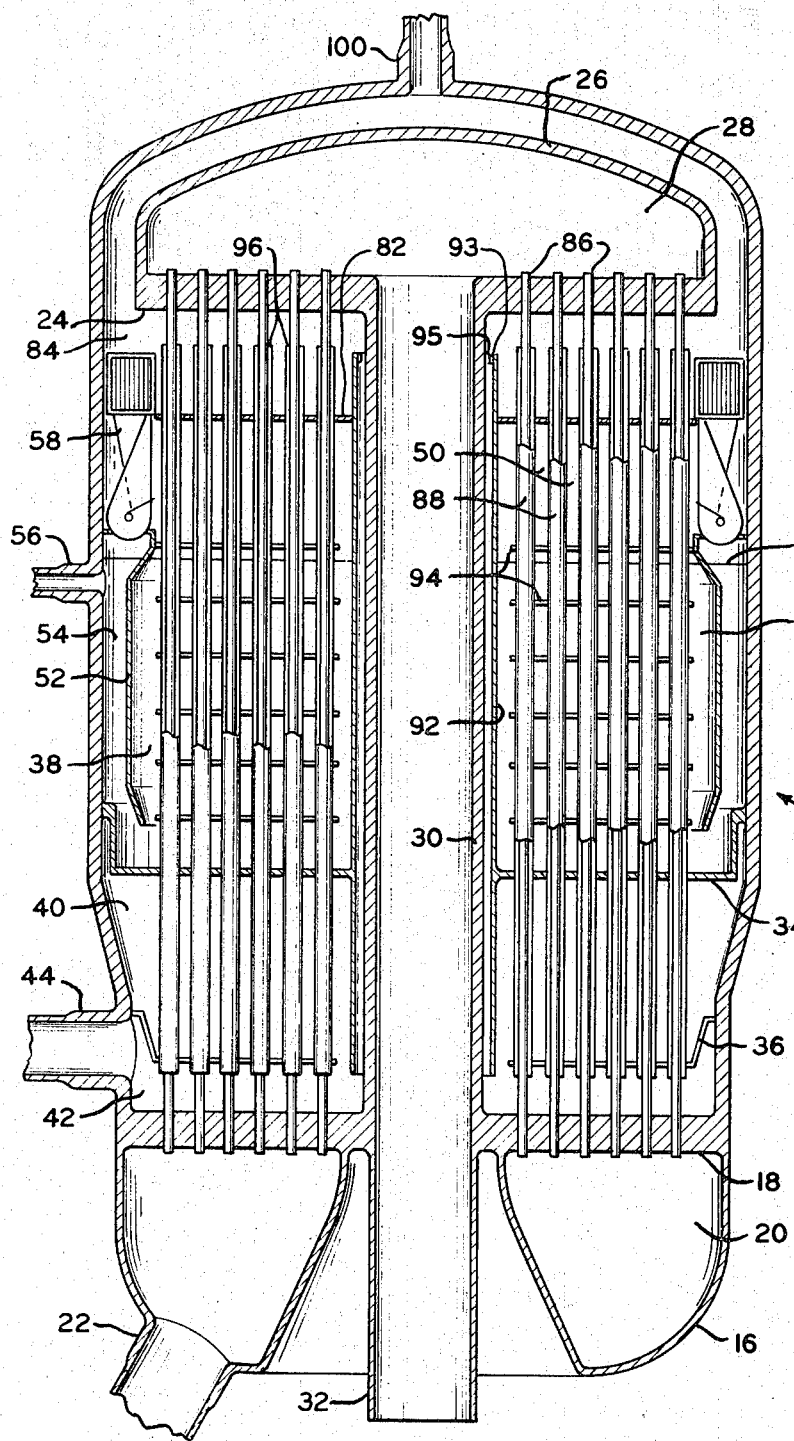
FIG. 1 is a vertical sectional elevation of a vapor generator apparatus embodying the present invention.

In FIG. 1 of the drawings, there is illustrated a vapor generator apparatus 10 constructed according to the present invention. The vapor generator 10 comprises a vertically elongated, cylindrical shell 12 whose ends are closed by upper and lower closure heads 14 and 16, respectively, to define a substantially closed pressure vessel. Adjacent the bottom of the vessel a horizontally disposed, lower tube sheet 18 is integrally attached about the wall of the vessel 12. The lower closure head 16, for purpose of thermal insulation that will be apparent hereinafter, is preferably formed of an annular member, U-shaped in section, that defines in combination with the lower tube sheet 18 an annular heating medium inlet chamber 20 having an inlet nozzle 22 for supplying heating medium to the unit. An upper tube sheet 24 is vertically spaced above the lower tube sheet 18 within the vessel with its outer peripheral edge closely spaced from the inner surface of the shell 12. A dome-shaped head 26 is attached to the upper surface of the tube sheet 24 to define a heating medium outlet chamber 28. Heating medium is conducted from the outlet chamber 28 by means of an axially disposed, cylindrical conduit 30. The conduit 30 has an open upper end connected to the lower side of the tube sheet 24, the tube sheet being apertured to establish communication between the interior of the conduit and the chamber 28. The lower end of the conduit 30 attaches to the top side of the tube sheet 18, a central aperture being provided in the latter to permit passage of heating medium therethrough. A cylindrical conduit extension 32 attaches to the bottom side of the tube sheet 18 at the opening and forms an axial extension for the conduit 30 extending beyond the lower end of the lower closure head 16 for connection with the coolant inlet of a neutronic reactor (not shown).

The interior of the vessel is divided into three axially spaced sections by means of a pair of horizontally arranged partition plates 34 and 36 that are connected by means of thermally expandable connections about the wall of the shell 12. That section above the plate 34 is designated the vapor generation section 38, that between the plates 34 and 36 the superheat section 40, and that between the plate 36 and lower tube sheet 18, the vapor collection chamber 42. A vapor outlet nozzle 44 attaches to the wall of the shell 12 in communication with the vapor collection chamber 42 for passing superheated vapor produced in the vapor generator to a turbogenerator set or other point of use.

During operation of the vapor generator a body of vaporizable liquid is maintained within the vapor generation section 38 having a level 46 dividing the section into a lower liquid space 48 and upper vapor space 50. Annular plate means 52 concentrically spaced from the wall of the shell 12 in the section 38 defines an annular downcomer passage 54 for conducting liquid downwardly to the bottom of the section. The lower end of the plate means 52 is vertically spaced from the partition plate 34 to establish liquid communication between the annular passage 54 and the interior region of the vapor generation section 38. A feedwater inlet nozzle 56 attaches to the wall of the shell 12 in communication with a downcomer passage 54 for supplying feed liquid to the unit.

Figure 3:
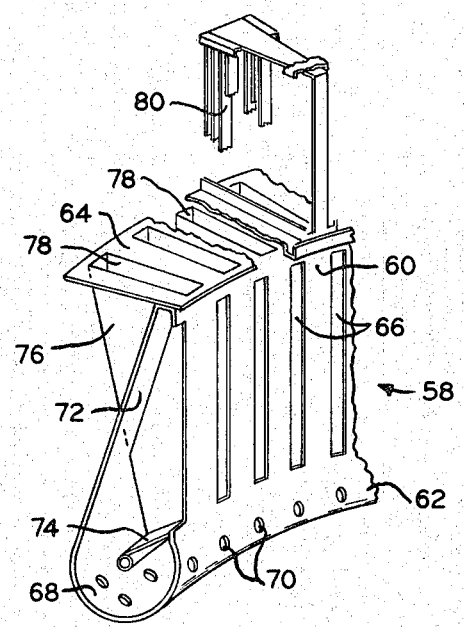
FIG. 3 is a partial perspective view illustrating the separator apparatus employed in the vapor generator of FIG. 1.

Annularly arranged vapor-separating apparatus 58 is disposed in the vapor space 50 of the vapor generation section 38 closely adjacent the wall of the shell 12. One form of separating apparatus that can conveniently be employed in the arrangement is shown in FIG. 3. This apparatus, which is described in detail in Pat. application Ser. No. 582,599 to Nicholas D. Romanos, filed Sept. 28, 1966, comprises annularly arranged plate means including front plate 60, bottom plate 62, and top plate 64. Front plate 60 contains circumferentially spaced openings 66 for supplying vapor-liquid mixture from the vapor space 50 to the apparatus. Bottom plate 62 is a member that is formed as a segment of a torus to define a whirl chamber 68 in which vapor-liquid mixture passed through the openings 66 is imparted with a rotary motion whereby the liquid constituent of the mixture will be separated by centrifugal action. Openings 70 are provided in the plate 62 for discharging separated liquid to the downcomer passage 54. Downwardly converging plates 72 and 74 extend between the whirl chamber 68 and openings 66 to define a mixture inlet passage in which the velocity of the mixture flowing to the whirl chamber is increased in order to assist vapor-liquid separation. Circumferentially spaced, vertical sideplates 76 are provided between each of the inlet passages to define vapor outlet passages which conduct separated vapor from the whirl chamber. These passages communicate with openings 78 provided in the top plate 64 for discharge of vapor from the apparatus. Atop the top plate 64 and enclosing the opening 78 are secondary separator apparatus in the form of contact drier plates 80 operative to remove any liquid particles entrained in the vapor emerging from the openings 78.

A horizontally disposed plate 82 whose location as shown in FIG. 1 is substantially coincident with that of separator top plate 78 serves to direct vapor-liquid mixture from the vapor space 50 of the vapor generation chamber to the separator inlet openings 66. The plate 82 is spaced vertically below the upper tube sheet 24 to define a drying section 84 in the vapor space 50 into which separated vapor from the separator apparatus is discharged and within which a slight amount of heat may be imparted thereto in order to further dry and/or impart a slight amount of superheat to the vapor.

According to the invention, vertically extending tubes 86 extend between the tube sheets 18 and 24 for conducting heating medium from the inlet chamber 20 to the outlet chamber 28. These tubes form a tube bundle that substantially fills the transverse cross section of the vessel and operate to bring heating medium in heat exchange relation with the vaporizable fluid flowing in the various sections of the unit. About each of the tubes 86 is provided a concentrically spaced, open ended cylindrical sleeve 88 that communicates at its upper end with the drying section 84 of vapor space 50 and at its lower end with the vapor collection chamber 42. A similar, but enlarged diameter sleeve 92 encloses the central conduit 30 and is coextensive with sleeves 88. The sleeves 88 and 92, in passing through the sections of the unit, are sealedly retained in each of the partition plates 34 and 82 and loosely retained in plate 36, Other plates 94 may be disposed throughout the interior of the vessel to provide lateral support for the tube bundle. The plates 94 may contain openings extending longitudinally of the vessel in order to permit axial flow of vaporizable fluid therethrough. If, in the alternative, no such openings are provided, spaces must be provided at the peripheral ends of the plates 94 to permit the vaporizable fluid to flow in sinusoidal fashion about the plates from bottom to top of the vapor generation chamber 38.

The sleeves 88 define annular passages 96 about each of the tubes 58 for conducting dry vapor from the drying section 84 to the vapor collection chamber 42. In flowing through the passages 96, the dry vapor functions as an intermediate heat transfer fluid capable of transferring heat from the high temperature heating medium flowing through the interior of the tubes 58 to the lower temperature vaporizable fluid on the exterior of the sleeves. Due to the fact that the flowing vapor is heated to a temperature intermediate that of the heating fluid and the vaporizable liquid the temperature difference across the wall of the tubes 58 is reduced to concomitantly reduce the problems of thermal stress that had heretofore been attendant in units employing molten liquid as a heating medium. Moreover, by providing a higher temperature intermediate heat transfer unit in the area of the body of vaporizable liquid that defines the lower liquid space 48 of the vapor generator section 38, the danger of freezing of the heating medium in this region is substantially eliminated.

The sleeve 92 surrounding conduit 30 is provided with a flow restrictor 93 at its upper end and forms an insulating space 94 about the conduit. In order to impart desired superheat temperatures to the vapor produced in the unit, the space between the plates 34 and 36, referred to as superheat section 40, is maintained as an area of vapor stagnation such that little or no heat is expended by the vapor flowing through the passages 96 in this section, all of the heat extracted from the heating medium by the vapor going to raise its temperature to the desired superheat temperature.

Figure 4:
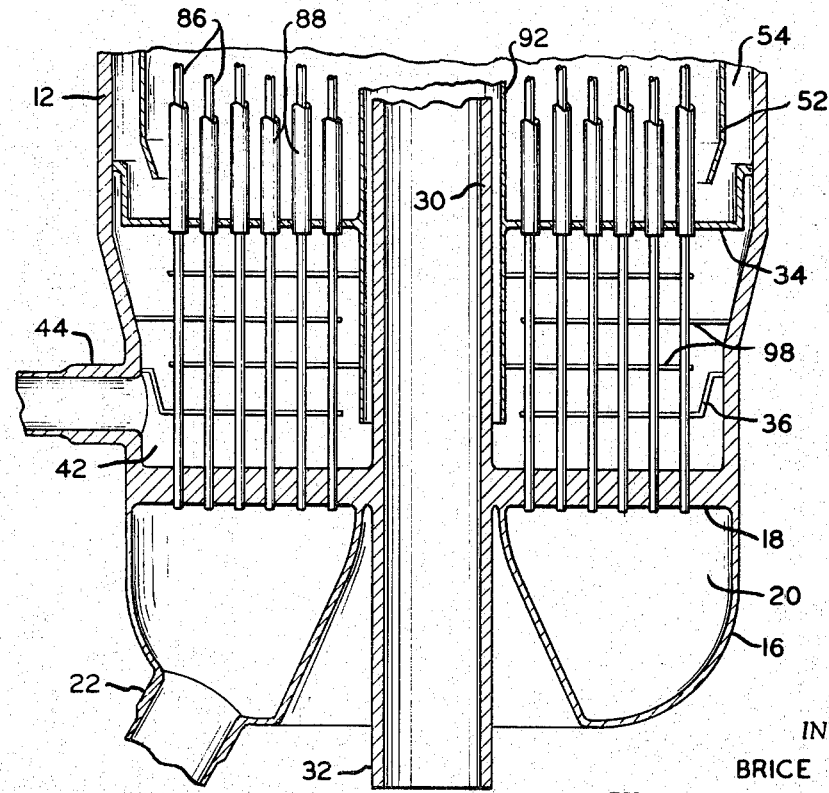
FIG. 4 is a partial sectional elevation illustrating another embodiment of the invention.

In the alternate vapor generator organization illustrated in FIG. 4, the arrangement of FIG. 1 is altered to the extent that the sleeves 88 that surround the tubes 58 terminate in the intermediate tube sheet 34. Thus vapor flowing through the passages 96 is discharged into the superheat section 40 which is arranged to contain baffle plates 98 for directing vapor in cross flow relation to the tubes 58 whereby the vapor will have its temperature raised by extracting heat from the tubes before entering the vapor collection chamber 42.

Figure 2:
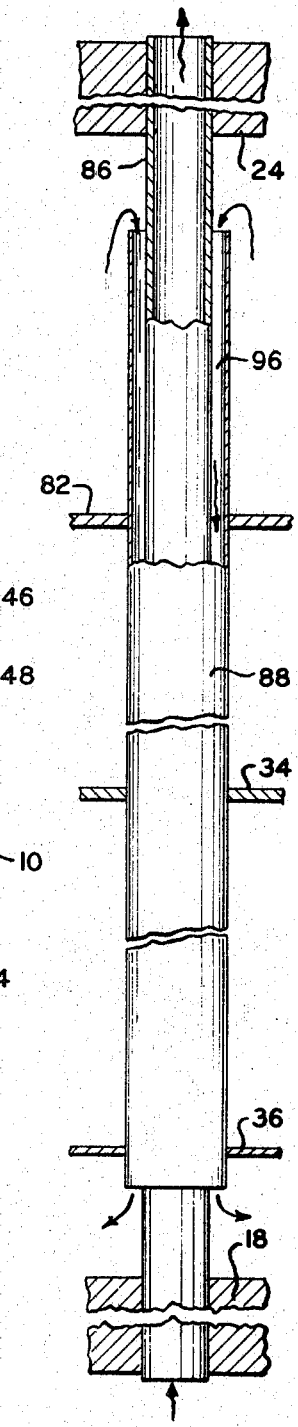
FIG. 2 is an elevational view, partly in section, illustrating a typical tube and sleeve arrangement according to the present invention.

The operation of the herein disclosed vapor generator unit is as follows. A high temperature heating medium such as molten metal or molten metal salts is supplied to the inlet chamber 20 through nozzle 22. From the chamber 20 the heating medium travels upwardly through the tubes 86 to the outlet chamber 28 and thence from the chamber 28 through the discharge conduit 30 and extension 32. At the same time vaporizable liquid is supplied to the unit through inlet nozzle 56. The incoming liquid flows downwardly through the downcomer passage 54 to the bottom of the vapor generation chamber 38 to provide a body liquid therein that immerses the heating medium conducting tubes and sleeves 88 that comprise the tube bundle. Due to the transfer of heat from the heating medium to the vaporizable liquid a portion of the liquid is transformed into vapor which passes to the vapor space 50 above the liquid level 46 therefrom and is directed by means of the baffle plate 82 into and through the separator apparatus 58 with separated vapor passing upwardly through the drying space 84 and separated liquid passing downwardly into the downcomer passage 54. From the drying section 84 of the vapor space 50 the principal portion of the vapor is caused to flow into and through the passages 96 formed about the tubes 86 by means of the sleeves 88. While flowing through the passages 96, the vapor extracts heat from the heating medium that flows through the tubes 86 and transfers this heat to the vaporizable fluid on the exterior of the tubes. In the embodiment of FIG. 1, the vapor is conducted through the passages 96 to be discharged into the vapor collection chamber 42 and in flowing through the superheating section 40 which is devoid of vaporizable liquid is permitted to retain the heat extracted from the heating medium, thereby causing its temperature to be raised to the desired superheat temperature. In the embodiment of FIG. 2, the sleeves 88 terminate in the partition 34 such that the flowing vapor is discharged into the superheating section 40 wherein it flows circuitously about the baffles 98 in crossflow relation to the tubes 86 prior to being discharged into the vapor collection chamber 42. The superheated vapor is passed from the chamber 42 through the outlet nozzle 44 and from there is conducted to the turbine of the turbogenerator set or to its other point of use. In order to regulate the temperature of the superheated vapor produced in the unit, provision in the form of a vapor offtake nozzle 100 may be made to extract saturated vapor from the vapor space 50 for mixing with the superheated vapor emerging from the vapor outlet nozzle 44. Controls, well-known in the art, may be employed to regulate the amount of saturated vapor extracted through the nozzle 100 for tempering the superheated vapor that is passed through the nozzle 44 in order to maintain the temperature of the vapor supplied to the turbine at the desired level.

While the vapor generator of the present invention has been described as one in which liquid metal or liquid metal salts are used to impart heat to vaporizable fluid, it will be apparent to those skilled in the art that it is also possible to use a high pressure, high temperature fluid other than those mentioned here as the means for heating the vaporizable fluid flowing through the unit.

It will be understood that various changes in the details, materials and arrangements of parts which have been herein described and illustrated in order to explain the nature of the invention may be made by those skilled in the art within the principle and scope of the invention as expressed in the appended claims.

I claim:

1. In a vapor generator organization wherein vapor is produced by the indirect transfer of heat between a fluid heating medium and a vaporizable liquid, the combination comprising:
   a. a vertically elongated vessel;
   b. means for circulating fluid heating medium through said vessel including a plurality of fluid-conducting tubes forming a tube bundle arranged to substantially fill the transverse cross section of said vessel;
   c. means forming a vapor generation chamber within said vessel;
   d. means for supplying vaporizable liquid to said vapor generation chamber to provide a body of liquid therein having a level defining a lower liquid space and an upper vapor space;
   e. means forming sleeves enclosing the tubes of said tube bundle and concentrically spaced therefrom to form annular passages substantially coextensive with said tubes through said vapor generation chamber;
   f. said sleeves having their upper ends open and disposed in fluid communication with said vapor space;
   g. means for directing a flow of vapor from said vapor space through said annular passages to interpose said flowing vapor in indirect heat exchange relation between said fluid heating medium and said body of liquid;
   h. means for collecting said flowing vapor at the discharge ends of said passages; and
   i. means for passing said flowing vapor from said collecting means to a point of use.

2. The combination as recited in claim 1 including:
   a. laterally extending partition means disposed in said pressure vessel intermediate the ends thereof and dividing said pressure vessel into an upper evaporation section containing said liquid space and said vapor space and a lower superheating section disposed below said evaporation section; and
   b. said superheating section comprising means to transfer heat extracted from said fluid heating medium to said flowing vapor to raise the temperature of said vapor to a predetermined superheat temperature.

3. The combination as recited in claim 2 wherein said passage-forming sleeves terminate at their lower end in said vessel-dividing partition means for discharging said flowing vapor into said superheating section and said superheating section includes baffle means for directing said flowing vapor in cross flow relation to the tubes of said tube bundle.

4. The combination as recited in claim 2 including:
   a. second laterally extending partition means spaced below said vessel-dividing partition means and creating an area of minimal fluid circulation in said superheating section; and
   b. said passage-forming sleeves terminating at their lower ends in said second partition means for conducting flowing vapor through said superheating section in parallel relation to said tubes.

5. A vapor generator organization for producing vapor by the indirect transfer of heat between a fluid heating medium and a vaporizable liquid comprising, in combination:
   a. a vertically elongated, generally cylindrical shell defining a pressure vessel;
   b. means for circulating fluid heating medium through said vessel including:
      i. a first tube sheet disposed in said shell and attached to the wall thereof adjacent the bottom to form a heating medium outlet chamber;
      ii. a second tube sheet disposed in said vessel and upwardly spaced from said first tube sheet;
      iii. generally dish-shaped head means attached to said second tube sheet and forming a heating medium inlet chamber;
      iv. a plurality of vertically straight tubes forming a tube bundle arranged to substantially fill the transverse cross section of said vessel extending between said first and second tube sheets and communicating at their ends with said heating medium inlet and outlet chambers;
      v. axially extending conduit means attached at its upper end to said second tube sheet in communication with said heating medium inlet chamber and at its lower end to the wall of said shell in communication with the exterior thereof; and
      vi. means for connecting the lower end of said conduit means and said heating medium outlet chamber to a means for regenerating the heating medium circulating through said vessel;
   c. generally cylindrical plate means concentrically disposed between said tube bundle and the wall of said shell to form an interior vapor generation chamber and an exterior, annular downcomer passage;
   d. a vapor space above said vapor generation chamber;
   e. means for supplying vaporizable liquid to said downcomer passage to provide a body of liquid within said vapor generation chamber having a level defining a liquid space and a vapor collection space thereabove;
   f. separator means operatively disposed within said vessel to receive vapor-liquid mixture from said vapor generation chamber and to discharge separated liquid to said downcomer passage and separated vapor to said vapor space;
   g. means forming sleeves enclosing the tubes of said tube bundle and concentrically spaced therefrom to form annular passages substantially coextensive with said tubes through said vapor space and said vapor generation chamber;
   h. means for directing a flow of vapor from said vapor space through said annular passages interposing said flowing vapor in indirect heat exchange relation between said fluid heating medium and said body of liquid;
   i. means for collecting said flowing vapor at one discharge ends of said passage; and
   j. means for passing said flowing vapor from said collecting means to a point of use.

6. The combination as recited in claim 5 including:
   a. laterally extending partition means spaced upwardly from said first tube sheet to define the bottom of said evaporation chamber and forming a superheating section therebelow; and
   b. said superheating section comprising means to transfer heat extracted from said fluid heating medium to said flowing vapor to raise the temperature of said vapor to a predetermined superheat temperature.

7. The combination as recited in claim 6 wherein said passage-forming sleeves terminate at their lower end in said vessel-dividing partition means for discharging said flowing vapor into said superheating section and said superheating section includes baffle means for directing said flowing vapor in cross flow relation to the tubes of said tube bundle.

8. The combination as recited in claim 6 including:
   a. a second laterally extending partition means disposed in said superheating section spaced intermediate said first tube sheet and said other partition means and creating an area of minimal fluid circulation therebetween; and
   b. said passage-forming sleeves terminating at their lower ends in said second partition means for conducting flowing vapor through said superheating section in parallel relation to said tubes.